Patented May 12, 1942

2,282,790

UNITED STATES PATENT OFFICE 2,282,790

STABILIZATION OF GLYCERIDE OILS

Sidney Musher, New York, N. Y., assignor to Musher Foundation Incorporated, New York, N. Y., a corporation of New York No Drawing. Application April 23, 1940,
Serial No. 331,185

6 Claims. (Cl. 260—398.5)

The present invention relates to the stabilization of fish and similar oils against oxidative deterioration and rancidity.

The fish and fish liver oils including cod liver oil, halibut liver oil, tuna fish liver oil, herring oil, salmon oil, menhaden oil, sardine oil, shark liver oil, etc., are highly subject to oxidative deterioration, loss of vitamin A content and development of rancidity.

This deterioration very materially increases when the oil is subjected to contact with water or when it is exposed to air. It is particularly subject to oxidation, for example, when incorporated in emulsified form in water because then each of the globules of the oil is directly contacted with the water and hydrolysis and oxidation take place very rapidly under these circumstances.

It has now been found that emulsions and aqueous dispersions of these oils may be prepared which will be highly stable and which will not only tend to maintain the vitamin potency but will actually stabilize the oils against oxidative deterioration and rancidity and tend to render them even more stable to oxidative deterioration than if they were kept in substantially pure condition and not in the aqueous dispersion.

The oils treated in accordance with the present invention consist of over 96% and in most cases of over 97.5% of highly unsaturated glycerides of fatty acids which present a special and difficult problem to handle from the standpoint of susceptibility to oxidation and rancidity.

It has been found that the stabilizing effect of the present invention may be obtained by dispersing or emulsifying these fish and fish liver oils in their original glyceride oil or fat form in aqueous concentrated milk-solids-not-fat and particularly in aqueous concentrated whey, desirably where the whey has been subjected to a temperature sufficiently high as to produce caramelization.

Apparently the milk-solids-not-fat and particularly whey contains the proper proportion of ingredients so that when these oils, such as cod liver oil, are dispersed thoroughly with, or preferably emulsified with the whey, the oils are rendered substantially stabilized against oxidative deterioration.

The whey that is particularly utilized in accordance with the present invention is obtained from the manufacture of cheese and is the material drawn off after the milk has been curdled with rennet, for example, and after the curd has formed the proper degree of hardness. Of particular importance for use is the whey that is obtained from the manufacture of cottage cheese, whereby coagulation is effected by natural souring and the liquid has been heated nearly to boiling. The whey is desirably further treated in order to remove a portion of the lactose, the lactose being allowed to crystallize out.

The whey is substantially free of casein and of fat and will contain about 70% to 75% of lactose and 10% to 15% protein, the protein being substantially free of casein and being present in the form of milk albumin.

This de-sugared whey, after a portion of the lactose has been allowed to crystallize out, will contain about 35% to 45% protein in the form of albumin and about 13% to 17% total ash, based upon the solids weight of the whey.

Apparently in the production of the whey, antioxygenic action is materially enhanced and it appears as if the reduction in the lactose content is desirable to obtain the full antioxygenic effect.

Moreover, it has been found of particular desirability to subject the whey to a temperature of at least about 220° F. and preferably to 235° F. to 245° F. for about 15 to 30 minutes or more at some stage in its processing whereby the whey is caramelized. The caramelization process further enhances the protective effect of the whey and unless the whey has been subjected to this caramelization step, the most desirable results of the present invention are not secured.

The whey or other similar milk solids is desirably adjusted to a pH of about 4 to 6 and preferably to a pH of about 5 before caramelizing or subjecting to the elevated temperature treatment.

The concentrated or condensed whey is used as the aqueous medium through which the vitamin containing oil is dispersed in a minor amount, the oil occupying the discontinuous phase.

The whey is first concentrated to at least 20% to 25% total solids before the fish glyceride oil is emulsified in it. The caramelization of the whey may take place prior to or after the emulsification of the oil therein.

For example, whey may be evaporated under reduced pressure to about 25% solids content. The whey may then be subjected to caramelization at about 245° F. for 30 minutes and, following the caramelization of the whey, the cod liver oil or other similar oil may be emulsified or finely dispersed in the caramelized whey.

The vitamin containing oil may be added to the concentrated or condensed whey or similar milk solids in any minor amount, but it is preferable to add between about 10% and 25% of the oil to the concentrated milk solids and for the oil to be thoroughly emulsified or dispersed in the milk solids. It is important that the glyceride oil occupy the disperse discontinuous phase and the concentrated milk solids occupy the continuous aqueous phase in order to obtain the desirable results of the present invention.

In addition to using whey as the source of milk-solids-not-fat, other aqueous dispersions of milk solids may also be employed including particularly concentrated buttermilk where at least a portion of the lactose has been converted to lactic acid.

There may also be utilized evaporated buttermilk containing about 25% to 30% total solids, condensed or semi-solid buttermilk containing about 35% to 45% total solids, dried buttermilk rendered aqueous by dilution, skim milk in concentrated condition, whole milk, whey residue or other similar forms of milk-solids-not-fat.

Where the milk-solids-not-fat are first obtained in a substantially dry condition, a sufficient amount of water is added in order to render the milk solids substantially plastic and capable of taking the oil in the disperse phase thereof. When the fish oil is thereupon dispersed or emulsified in the milk solids, the milk solids should occupy the aqueous continuous phase and the vitamin containing oil the disperse phase and a sufficient amount of water should be present so that this dispersion is possible.

Where, for example, powdered skim milk is employed, the powdered skim milk may first be combined with from 4 to 5 parts of water and the vitamin containing oil such as the cod liver oil may then be emulsified in the aqueous skim milk dispersion to obtain the enhanced stabilizing effects.

Where dried skim milk is employed as indicated above, the skim milk before having been subjected to the final drying operation and while still in aqueous condition, is desirably caramelized at about 235° F. to 245° F. or more.

Another method that may be carried out is for the cod liver oil to be emulsified in the concentrated milk solids and for the combination to be subjected to the caramelization or heating step to produce the caramelized product whereby enhanced stabilization is obtained.

It has been found of particular importance for the whey or similar milk solids to contain at least about 20% to 25% total solids before incorporating the fish oil therein, but these milk solids must be sufficiently aqueous so as to obtain a proper dispersion of the oil in the aqueous continuous medium of the milk solids.

After the fish oil has been emulsified in the aqueous milk solids, so that the oil occupies the discontinuous phase, the resultant product may further be evaporated or concentrated or may be completely dried.

The fish oil may be emulsified in the course of the drying of the whey, provided the fish oil occupies the discontinuous or disperse phase and is added to the whey while the whey is in substantially aqueous condition.

Although a thorough admixture of the fish oil in the milk solids is sufficient to produce markedly improved stability, homogenization or other similar processing such as by placing the combination through a colloid mill which would more thoroughly produce contact between the oil globules and the whey will give even greater stabilizing action. This result is particularly unusual since it is normally to be expected that the oil globules in contact with the water of the whey would be rendered much more unstable than if they were not in contact with such aqueous products.

During the homogenization of the glyceride oil in the milk-solids-not-fat, it is particularly desirable for the homogenization to take place at a slightly elevated temperature such as over about 180° F. and preferably at between 200° F. to 210° F. or more. Apparently an enhanced stabilization takes place where the homogenization is permitted to proceed at the elevated temperature.

It is preferable for these aqueous emulsions in concentrated or dried form and containing these oils in the disperse phase to be utilized without further combination with other materials.

Where these products are, however, combined with other materials and particularly with other poultry and animal stock, it is desirable for the combination to be made slowly and without too much agitation in order not to disturb the position of the glyceride oil particles dispersed in the milk solids.

Among the different products that may be prepared in accordance with the present invention are the following:

1. 10% of cod liver oil is added to condensed whey containing about 30% total whey solids. The cod liver oil is emulsified in the concentrated whey by placing the combination through an homogenizer at 180° F.

2. Plastic buttermilk containing about 40% total solids is emulsified with 10% of cod liver oil and the combination is then put through an homogenizer at a temperature of about 190° F. The combination at pH 5.5 is heated to 225° F. for 10 minutes and then roller drum dried.

3. 5% of cod liver oil is added to and emulsified in condensed skim milk having about 30% total solids. Before the addition of the cod liver oil, the condensed skim milk had been heated to 245° F. for 30 minutes under pressure.

4. Whey is condensed to 20% total solids. The whey is then caramelized at 250° F. for 1 hour. 10% of cod liver oil is added to the caramelized whey and emulsified in it. The finished combination is then drum dried, about 10% of uncaramelized unconcentrated whey having been added to the composition in order to facilitate drying.

Together with the milk-solids-not-fat, there may also be added a small amount of lecithin or other phosphatides, phosphoric acid, aliphatic polycarboxylic acids such as tartaric acid, citric acid, succinic acid, etc., and also molasses, particularly blackstrap molasses.

For example, a combination of 30% condensed whey having about 35% total solids and 70% blackstrap molasses may be prepared and utilized as the aqueous continuous phase in which cod liver oil or similar fish oil is dispersed or emulsified.

There might also be utilized combinations of milk protein such as casein and milk sugar such as lactose with milk phospholipins.

Among other medicinal and/or vitamin containing oils that may similarly be treated for stabilizing in accordance with this invention and whereby in aqueous emulsified condition they are substantially stabilized against oxidative deterioration are castor oil, wheat germ oil and white refined mineral oil.

For example, castor oil acquires its characteristic objectionable odor and taste as rancidity sets in. This has been avoided to a very marked degree by emulsifying the castor oil in concentrated milk-solids-not-fat, preferably caramelized, in small amounts.

Together with or in lieu of the milk-solids-not-fat, there may be employed the substantially concentrated sulphurous acid extract of corn, prepared by extracting corn with sulphurous acid at a pH of between about 3 and 4.5, at a temperature between about 105° F. and 120° F. and for a period of 18 to 45 hours. After the soaking of the corn, the acidified water is drained away. The water solution may then be vacuum concentrated to about 70% total solids and incidental to the vacuum concentration, the pH may be neutralized to between about 5 and 6.9 and the extract filtered. The extract thus obtained will contain between about 25% and 40% total nitrogenous material determined as protein. The concentrated corn extract thus obtained and containing between about 65% and 85% total solids may be used in an amount between about 60% and 80% as the continuous aqueous phase in which cod liver or similar fish oils are dispersed or emulsified in a minor proportion in order to render them highly stable to oxidative deterioration. Although it is not clear what reaction takes place at the elevated temperature between the concentrated milk-solids-not-fat such as the concentrated whey and the fish liver or fish oil at the interface of the fat globule, apparently some form of a chemical combination takes place at the elevated temperature which results in greatly increased stability as compared to the results obtained when the composition containing the concentrated milk-solids-not-fat or the concentrated whey is not heated.

The present application is a continuation in part of application, Serial No. 239,319 filed November 7, 1938, now Patent No. 2,198,215, and Serial No. 317,175 filed February 3, 1940, now Patent No. 2,198,218.

Having described my invention, what I claim is:

1. A substantially stabilized glyceride oil composition comprising a dispersion of a minor amount of a glyceride oil in a major amount of concentrated caramelized milk-solids-not-fat, said glyceride oil being substantially stabilized against oxidative deterioration.

2. A substantially stabilized glyceride oil composition comprising a dispersion of a minor amount of a glyceride oil in a major amount of concentrated caramelized milk-solids-not-fat, said glyceride oil being substantially stabilized against oxidative deterioration.

3. A substantially stabilized glyceride oil composition comprising a dispersion of a minor amount of a glyceride oil in a major amount of concentrated caramelized whey, said glyceride oil being substantially stabilized against oxidative deterioration.

4. A method of stabilizing glyceride oils against oxidative deterioration which comprises dispersing a minor amount of said glyceride oils in a major amount of concentrated caramelized milk-solids-not-fat.

5. A method of stabilizing glyceride oils against oxidative deterioration which comprises dispersing a minor amount of said glyceride oils in a major amount of concentrated caramelized milk-solids-not-fat.

6. A method of stabilizing glyceride oils against oxidative deterioration which comprises dispersing a minor amount of said glyceride oils in a major amount of concentrated caramelized whey.

SIDNEY MUSHER.